UNITED STATES PATENT OFFICE

HERMAN A. BRUSON, OF PHILADELPHIA, PENNSYLVANIA, ASSIGNOR TO THE RESINOUS PRODUCTS & CHEMICAL CO. INC., A CORPORATION OF DELAWARE

SALTS OF KETONIC ACIDS DERIVED FROM PETROLEUM HYDROCARBONS AND METHOD OF PREPARING SAME

No Drawing.   Application filed October 26, 1929.   Serial No. 402,803.

This invention relates to salts of new organic acids obtained from petroleum oils, petroleum hydrocarbon distillates, and other petroleum hydrocarbon fractions, by condensation with polybasic acid anhydrides as described in my co-pending patent application, filed Oct. 10, 1929, Serial No. 398,823 now Patent No. 1,882,762.

The above mentioned acids represent complex mixtures of compounds containing one free carboxyl group, one ketonic group, and a plurality of methylene groups linked to the carbon atom of the ketonic group. The number of methylene groups is dependent upon the nature of the aliphatic hydrocarbons which comprise the petroleum hydrocarbon used. For example, with gasoline which consists of normal pentanes, hexanes, heptanes, and octanes, the keto acids derived by condensation with phthalic anhydride would consist of a mixture of compounds having the probable structural formula,

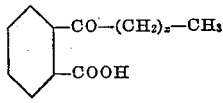

wherein $x$ is four, five, six or seven respectively. Since however, gasoline contains branched-chain hydrocarbons in addition to the normal, straight-chained hydrocarbons, it can readily be seen that the ketonic acids produced are even more complex than indicated in the simplest formula shown above. In the case of higher boiling petroleum fractions such as kerosene, naphtha, heavy naphtha, paraffin oil, paraffin wax and related compounds derived from, or associated with petroleum oils, the number of methylene groups increases considerably. It is evident therefore that the complexity of the ketonic acids derived from these hydrocarbons precludes exact classification; except that the former are all monobasic acids containing a keto group. This applies equally well to the acids derived from the condensation of petroleum oils or petroleum hydrocarbon distillates with anhydrides of other polybasic acids, namely, succinic anhydride, maleic anhydride, and the like.

The above mentioned ketonic acids, whether derived from phthalic, maleic, or succinic anhydride, and petroleum oils or petroleum distillates, form resinous solids which possess valuable properties. Their heavy metal salts for example, which are the object of this invention, form resinous masses, insoluble in water, but readily soluble in a variety of organic solvents. They may thus find special applications in the paint and varnish industries as driers for oils, or as resins, water-proofing agents, and the like.

I have found that the ketonic acids derived for example, from the condensation products of phthalic anhydride with petroleum hydrocarbons, (crude petroleum oils, vaseline, paraffin, paraffin oil, naphtha, kerosene, gasoline) as described more fully in my co-pending patent application, Serial No. 398823 may be neutralized with bases or alkalies to form water-soluble salts or soaps. For this purpose hydroxides, oxides, or carbonates of the alkali metals such as sodium or potassium may be used, or amino compounds such as ammonia itself or its aliphatic derivatives. These water soluble salts when treated with aqueous solutions of heavy metal salts, react by double decomposition to form a precipitate of the corresponding heavy metal salt of the organic keto-acid derived from the petroleum hydrocarbon. The latter heavy metal salts are readily isolated by filtration and purified by washing with warm water.

I have thus prepared the following metallic salts from the above mentioned ketonic acids, namely, the aluminum, barium, cadmium, calcium, cerium, chromium, cobalt, copper, iron, lead, magnesium, manganese, mercury, nickel, strontium, thallium, tin, titanium, uranium, vanadium and zinc salts.

When dry, these salts form brittle, resinous masses soluble in a variety of organic solvents. Those derived from phthalic anhydride and petroleum hydrocarbons are the most important because of their cheapness as compared with those acids derived from petroleum hydrocarbons and maleic or succinic anhydrides.

The heavy metal salts of the keto-acids prepared by condensing phthalic anhydride with gasoline for example are soluble in benzol, toluene, acetone, butyl acetate, and in fatty oils such as linseed oil, soya-bean oil, tung oil, and the like. When incorporated in such drying oils the heavy metal salts, more especially the cobalt, manganese, iron, vanadium, and lead salts act as "driers"; that is they speed up the drying of the oil upon exposure to air. Only small amounts of metal are required, so that these salts when dispersed in drying oils act as true catalysts of oxidation.

In practicing my invention the procedure to use consists in general as follows:

Example I

A ketonic acid is prepared, according to the process described in my co-pending patent application Serial No. 398,823, by heating a mixture of 30 pounds phthalic anhydride with 100 pounds petroleum naphtha and 60 pounds anhydrous aluminum chloride or other Friedel-Crafts type of catalyst at about 70–90° C. until the evolution of hydrogen chloride ceases, decomposing the aluminum chloride complex thus obtained with excess hot sodium carbonate solution, and thereafter acidifying the filtrate from the alumina thus formed. There is obtained a yellowish waxy resinous mass consisting of mixed monobasic ketonic acids.

The acid mixture thus obtained is converted into its water soluble sodium salt by gently warming with a 10 percent solution of sodium hydroxide, added in sufficient quantity to give a solution substantially neutral to phenolphthalein.

To this aqueous solution of the sodium salts of the ketonic acid mixture, there is then added a 10 percent solution of a water soluble heavy metal salt such as for example, lead nitrate, cobalt sulfate, manganese chloride, or ferric sulphate. The mixture is stirred during addition of the salt solution, the latter being added in sufficient excess to precipitate all of the organic acid. The heavy precipitate of metal salt is filtered off, washed thoroughly with hot water and dried.

These salts dissolve readily in toluol or butyl acetate. They dissolve easily in linseed oil at about 400° Fahrenheit. In order to dry the oil the best results are obtained by adding sufficient of the above heavy metal ketonic acid salts to be equivalent to 0.1% by weight of cobalt or manganese or 0.25% by weight of lead upon the weight of the oil to be dried.

Example II

The ketonic acid mixture obtained from the hydrolysis of the condensation product of phthalic anhydride with gasoline or with kerosene is neutralized with a 10 percent solution of sodium carbonate. To this is then added an aqueous solution of chrome alum, aluminum sulphate, or zinc chloride in excess. The chromium, aluminum, or zinc salts respectively are precipitated. After washing and drying these salts are soluble in organic solvents and in drying oils.

In a similar fashion the salts of the other elements mentioned above, namely the barium, cadmium, calcium, cerium, copper, magnesium, mercury, nickel, strontium, thallium, tin, titanium, uranium and vanadium salts may be prepared by simply adding an excess of the aqueous solution of their respective water-soluble nitrates, chlorides, sulphates or acetates to the neutral solution of the sodium, potassium, or ammonium salts of the organic keto-acids.

I have successfully employed the condensation products of phthalic anhydride, succinic anhydride, and maleic anhydride respectively with crude and refined paraffin oils, petroleum distillates (kerosene, naphtha, gasoline), petroleum residues (paraffin wax, petroleum jelly) and petroleum oils (which have been freed from aromatic and unsaturated hydrocarbons by treating with fuming sulphuric acid) in the preparation of the above described heavy metal salts.

I have also prepared fused salts by heating the free ketonic acids with oxides, hydroxides, and carbonates of the heavy metals. However, the precipitation method is preferable because the acids are decomposed by heat and do not therefore produce as uniform a product as that obtained by precipitation.

What I claim is:

1. A new composition of matter consisting of salts of the acid mixture which is obtained by hydrolyzing the product from the condensation of an anhydride of a polycarboxylic acid with a petroleum hydrocarbon essentially of aliphatic nature, and a Friedel-Crafts catalyst.

2. A new composition of matter consisting of metal salts of the acid mixture which is obtained by hydrolyzing the product from the condensation of an anhydride of a polycarboxylic acid with a petroleum hydrocarbon essentially of aliphatic nature, and a Friedel-Crafts catalyst.

3. A new composition of matter consisting of metal salts of the acid mixture which is obtained by hydrolyzing the product from the condensation of an anhydride of a polycarboxylic acid with a petroleum hydrocarbon essentially of aliphatic nature and anhydrous aluminum chloride.

4. A new composition of matter consisting of metal salts of the acid mixture which is obtained by hydrolyzing the product from the condensation of phthalic anhydride, anhydrous aluminum chloride and a petroleum hydrocarbon essentially of aliphatic nature.

5. A new composition of matter consisting of metal salts of the acid mixture which is obtained by hydrolyzing the product from the condensation of phthalic anhydride, anhydrous aluminum chloride and petroleum naphtha.

6. A new composition of matter consisting of metal salts of the acid mixture which is obtained by hydrolyzing the product from the condensation of phthalic anhydride, anhydrous aluminum chloride and gasoline.

7. A new composition of matter consisting of metal salts of the acid mixture which is obtained by hydrolyzing the product from the condensation of phthalic anhydride, anhydrous aluminum chloride and paraffin.

8. A new composition of matter consisting of cobalt salts of the acid mixture which is obtained by hydrolyzing the product from the condensation of phthalic anhydride, anhydrous aluminum chloride and a petroleum hydrocarbon essentially of aliphatic nature.

9. A new composition of matter consisting of lead salts of the acid mixture which is obtained by hydrolyzing the product from the condensation of phthalic anhydride, anhydrous aluminum chloride, and a petroleum hydrocarbon essentially of aliphatic nature.

10. A new composition of matter consisting of manganese salts of the acid mixture which is obtained by hydrolyzing the product from the condensation of phthalic anhydride, anhydrous aluminum chloride, and a petroleum hydrocarbon essentially of aliphatic nature.

11. A new composition of matter consisting of cobalt salts of the acid mixture which is obtained by hydrolyzing the product from the condensation of phthalic anhydride, anhydrous aluminum chloride and petroleum naphtha.

12. A new composition of matter consisting of lead salts of the acid mixture which is obtained by hydrolyzing the product from the condensation of phthalic anhydride, anhydrous aluminum chloride and petroleum naphtha.

13. A new composition of matter consisting of manganese salts of the acid mixture which is obtained by hydrolyzing the product from the condensation of phthalic anhydride, anhydrous aluminum chloride, and petroleum naphtha.

14. A method of preparing salts of the acid mixture which is obtained by hydrolyzing the product from the condensation of an anhydride of a polycarboxylic acid, a Friedel-Crafts catalyst, and a petroleum hydrocarbon essentially of aliphatic nature; which consists in neutralizing said acids with a member of the group consisting of amines, and of the oxides, carbonates and hydroxides of metals.

15. A method of preparing metal salts of the acid mixture which is obtained by hydrolyzing the product from the condensation of an anhydride of a polycarboxylic acid, anhydrous aluminum chloride and a petroleum hydrocarbon essentially of aliphatic nature; which consists in adding a solution of the salt of a polyvalent metal to a neutral solution of a water-soluble salt of said acids.

HERMAN A. BRUSON.